SUPPRESSED-CARRIER AMPLITUDE MODULATION

Filed May 5, 1951

INVENTOR
R. W. CHESNUT DECEASED
FLORENCE P. CHESNUT
HIS EXECUTRIX
BY H. A. Burgess
ATTORNEY

United States Patent Office 2,724,742

Patented Nov. 22, 1955

2,724,742

SUPPRESSED-CARRIER AMPLITUDE MODULATION

Roy W. Chesnut, deceased, late of Upper Montclair, N. J., by Florence P. Chesnut, executrix, Upper Montclair, N. J., assignor to Bell Telephone Laboratories, Incorporated, New York, N. Y., a corporation of New York Application May 5, 1951, Serial No. 224,732

4 Claims. (Cl. 179—15.5)

This invention relates generally to suppressed-carrier amplitude modulation and more particularly to methods and systems in which modulated waves are transmitted with carrier frequency components suppressed over media which tend to introduce uncontrolled frequency or phase shifts.

When either or both of the sidebands of an amplitude modulated wave are transmitted over a system which introduces an uncontrolled frequency or phase shift, a distorted reproduction of the signal is likely to be produced in the receiving end if the original carrier frequency is used for demodulation. The sidebands will undergo possible frequency and phase changes which are not shared by the carrier, and the reproduced signal is likely to suffer both frequency and phase distortion. In the past, this type of distortion has been avoided by transmitting the original carrier at either full or reduced amplitude along with the sidebands. The carrier thus undergoes the same frequency and phase changes as the sidebands and, when used for demodulation, produces an accurate reproduction of the original.

There are, however, a number of reasons why transmission of the carrier may not be desired. For example, transmitting the carrier at a full amplitude may overload repeaters in the transmission system or cause crosstalk between adjacent channels, while carrier transmission at reduced amplitude may lead to difficulties due to the sharply selective filters required to separate the carrier at the receiving end of the transmission system for amplification prior to demodulation.

The principal object of the present invention is to permit the accurate reproduction of the modulating signal at the receiving end of a transmission system introducing uncontrolled frequency or phase changes without transmitting the original carrier.

A more particular object is to avoid the difficulties which may tend to be introduced by transmission of the original carrier at either full or reduced amplitude.

Another object is to permit flexiblity in the design of amplitude modulation systems.

In accordance with the invention, single, vestigial, or double sideband signals may be transmitted with carrier frequency components suppressed without danger of distortion of the demodulated signal at the receiving end of a system introducing uncontrolled frequency or phase changes. The original carrier is derived from at least two pilot frequencies that are within the pass band of the transmission system, and such frequencies are themselves transmitted along with the sideband or sidebands at reduced amplitude. These pilot frequencies are separated from the sideband or sidebands sufficiently so that, at the receiving end of the system, they can be separated through comparatively wide and easy to build filters. The demodulating carrier is derived from these frequencies at the receiving end of the system and, since the transmitted frequencies undergo the same frequency and phase changes as the sideband or sidebands, it serves to reproduce the signal without frequency or phase distortion.

In one embodiment of the invention, the carrier is derived from two appropriate pilot frequencies by means of a third order modulator. In other embodiments, when it is desirable that the pilot frequencies be closer together, even higher odd order modulators are used.

A more thorough understanding of the invention will be obtained from the following detailed discussion. In the drawings.

Figure 1:
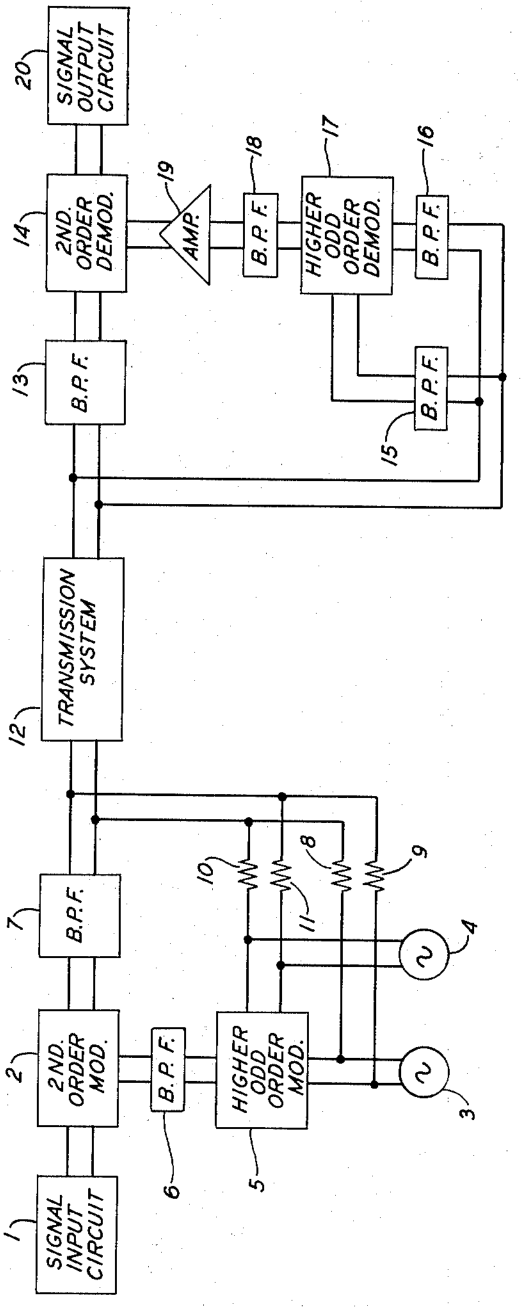
Fig. 1 is a block schematic diagram of a system embodying the invention.

The amplitude modulation system shown in Fig. 1 includes a signal input circuit 1 connected to a second order modulator 2. Input circuit 1 may, by way of example, supply a voice frequency band for program transmission over a carrier telephone system. Modulator 2 may be of any desired type, but is preferably of the balanced or double balanced type in order that the carrier may be suppressed. The carrier is derived from two pilot frequency generators 3 and 4. These two frequencies are supplied to a device 5 which, in order to distinguish from the usual second order modulator, will be referred to as a higher odd order modulator. One example of such a device is the third order modulator illustrated in Fig. 2. Others are the third order modulators shown in United States Patent 2,233,860, issued March 4, 1941, to R. O. Wise. The derived carrier is selected from modulator 5 by a band-pass filter 6 and supplied to second order modulator 2.

The sideband or sidebands which it is desired to transmit are selected from modulator 2 by a band-pass filter 7, while the pilot frequencies from which the carrier is derived are bridged off from the frequency generators 3 and 4 at reduced amplitude by resistors 8, 9, 10, and 11. The selected sideband or sidebands, along with the pilot frequencies, are supplied to the transmission system 12.

Transmission system 12 may be any type of system but is assumed to be one which tends to introduce uncontrolled frequency or phase shifts to transmitted signals. It may be, for example, a carrier telephone transmission system in which the transmitted signals are group modulated up and down in frequency at each repeater point to equalize attenuation in all channels. If the oscillators supplying the shifting modulators at each repeater point are independent oscillators which tend to vary at all in frequency, there is likely to be a net frequency shift the amount of which will depend upon the stability of the oscillators and the number of repeaters. By way of further example, transmission system 12 may comprise several carrier telephone transmission systems in tandem having respectively different transmission bands. Such an arrangement requires group modulation between adjacent carrier telephone transmission systems to shift the signals from the pass band of one system to that of the next. If the oscillators supplying the carrier frequency for such modulation are subject to frequency shifts of any kind, the transmitted signal will undergo corresponding frequency changes.

The receiving end of transmission system 12 is coupled to a band-pass filter 13, which selects the transmitted sideband or sidebands for application to a second order demodulator 14. The transmitted pilot frequencies are selected from the receiving end of transmission system 12 by a pair of band-pass filters 15 and 16 and are supplied to a higher odd order demodulator 17, which is identical to modulator 5 at the transmitting end of the system. Since the pilot frequencies are shifted in frequency and phase in the same manner as are the transmitted sideband or sidebands, demodulator 17 produces a demodulating carrier which is of the correct frequency and phase to reconstruct an undistorted signal. The proper carrier frequency is selected by a band-pass filter 18 and is brought to the proper amplitude level by an amplifier 19. The full strength carrier is supplied to second order demodulator 14 and the reconstructed signal is supplied to a signal output circuit 20.

The operation of the embodiment of the invention illustrated in Fig. 1 may best be understood if a more specific example is considered. In one such example, signal input circuit 1 supplies a frequency signal covering a band of from 50 to 8,000 cycles which, for simplicity, may be considered to extend from 0 to 8,000 cycles. The frequency of generators 3 and 4 are 120 and 104 kilocycles, respectively, and modulator 5 is a third order modulator which provides a carrier frequency of two times 104 minus 120, or 88 kilocycles. Second order modulation by modulator 2 thus supplies a lower sideband extending from 88 down to 80 kilocycles, which is selected by band-pass filter 7 and transmitted over transmission system 12. The two pilot frequencies of 120 and 104 kilocycles are also transmitted, but at reduced amplitude to avoid any overloading of repeaters or crosstalk between channels.

At the receiving end of transmission system 12, the sideband and the pilot frequencies will have been shifted the same number of cycles. If, for example, the cumulative frequency shift is a decrease of 25 cycles, the received sideband will extend from 87,975 cycles down to 79,975 cycles. If an 88 kilocycle carrier were used for demodulation, the reconstructed signal band would extend from 25 to 8,025 cycles instead of from 0 to 8,000, and there would, therefore, be severe frequency distortion. However, the two pilot frequencies will be received at 119,975 and 103,975 cycles, respectively, and the reconstructed carrier will be two times 103,975 minus 119,975 or 87,975 cycles. Such a carrier is selected by band-pass filter 18 and, when amplified, serves to reproduce an undistorted signal extending from 0 to 8,000 cycles.

Thus, in accordance with the invention, single sideband signal transmission is accomplished without distortion of the received signal. The difficulties of overloading and crosstalk which may be associated with the transmission of the carrier at full amplitude are avoided, as are the difficulties due to the sharply selective filter circuits required to separate the received carrier for amplification associated with transmission of the carrier at reduced amplitude. In addition, since the derived carrier at the receiving end of the system is in a circuit independent of that of the sideband, the demodulator 14 should be more free of distortion products than when the carrier is transmitted at full amplitude directly with the sideband.

If, in the example which has been given, the two frequencies 120 and 104 kilocycles will not traverse transmission circuit 12, other frequencies and other higher odd order modulators for the derivation of the carrier may be used. For example, the frequencies of pilot generators 3 and 4 may be 96 and 100 kilocycles, respectively. Since those frequencies are nearer to the sidebands, it is assumed that they will pass through transmission circuit 12 without difficulty. In this example, modulator 5 is a fifth order modulator which derives a carrier of three times 96 minus two times 100, which is, as before, 88 kilocycles.

Thus it may readily be seen that the present invention offers very great flexibility in the design of systems for the transmission of amplitude modulated waves with carrier frequency components suppressed. However, in order to present a more comprehensive picture of what may be done with two pilot frequencies to eliminate frequency errors, the generalized expression will be derived.

Let $A$=a positive integer, and (1)

$C=f(P_1, P_2)=AP_1-(A-1)P_2$ (2)

where:

$C$=the carrier frequency (suppressed for transmission), (3)

$P_1$=one pilot frequency, and (4)

$P_2$=the other pilot frequency. (5)

Let, $V$=the voice frequency to be transmitted, (6)

$B$=the sideband frequency produced by V and C at the transmitting end, and (7)

$\Delta S$=the error in frequency introduced into all frequencies transmitted over the system. (8)

Then, $C+\Delta S$ becomes the carrier frequency required at the receiving end to demodulate the sideband to voice without frequency error, (9)

$P_1+\Delta S$ becomes one pilot frequency at the receiving end, (10)

$P_2+\Delta S$ becomes the other pilot frequency at the receiving end, and (11)

$B+\Delta S$ becomes the sideband frequency at the receiving end. (12)

Then by Equations 2, 10, and 11, the derived carrier at the receiving end becomes $$A(P_1+\Delta S)-(A-1)(P_2+\Delta S)=AP_1-(A-1)P_2+\Delta S \quad (13)$$

$$=C+\Delta S \quad (14)$$

and from Equations 14 and 12, $$(C+\Delta S)-(B+\Delta S)=V \quad (15)$$

With the proper choice of frequencies $P_1$ and $P_2$, all of the frequency errors introduced by the system can be eliminated from the signal.

The order of modulation required to derive C from $P_1$ and $P_2$, for different values of the positive integer A is as follows:

| A | A−1 | Derivation of C | Order of Modulation |
|---|---|---|---|
| 2 | 1 | $2\times P_1-1\times P_2=C$ | Third order. |
| 3 | 2 | $3\times P_1-2\times P_2=C$ | Fifth order. |
| 4 | 3 | $4\times P_1-3\times P_2=C$ | Seventh order. |
| . | . | . | . |
| . | . | . | . |
| N | N−1 | $N\times P_1-(N-1)\times P_2=C$ | (2N−1)th order. |

The relation of the frequencies $P_1$ and $P_2$ to the carrier frequency C, is as follows from Equation 2:

$$C=AP_1-(A-1)P_2=AP_1-AP_2+P_2 \quad (16)$$

$$P_1=P_2-\frac{P_2-C}{A} \quad (17)$$

$$=C+\frac{A-1}{A}(P_2-C) \quad (18)$$

$$P_2=P_1+\frac{P_1-C}{A-1} \quad (19)$$

$$=C+\frac{A}{A-1}(P_1-C) \quad (20)$$

In terms of frequency differences these relations become:

$$P_2-P_1=\frac{1}{A-1}(P_1-C) \quad (21)$$

$$=\frac{1}{A}(P_2-C) \quad (22)$$

$$(P_1-C)=(A-1)(P_2-P_1) \quad (23)$$

$$=\frac{A-1}{A}(P_2-C) \quad (24)$$

$$(P_2-C)=A(P_2-P_1) \quad (25)$$

$$=\frac{A}{A-1}(P_1-C) \qquad (26)$$

The numerical examples tabulated below will help to make the implications of the above equations clear:

| Order of Modulation | A | A−1 | Car. Freq. C | Example I | | Example II | |
|---|---|---|---|---|---|---|---|
| | | | | $P_1$ | $P_2$ | $P_1$ | $P_2$ |
| | | | kc. | kc. | kc. | kc. | kc. |
| 3rd | 2 | 1 | 88 | 92 | 96 | 104 | 120 |
| 5th | 3 | 2 | 88 | 92 | 94 | 104 | 112 |
| 7th | 4 | 3 | 88 | 92 | 93.133 | 104 | 109.33 |
| 9th | 5 | 4 | 88 | 92 | 93 | 104 | 108 |
| . | . | . | . | . | . | . | . |
| . | . | . | . | . | . | . | . |
| . | . | . | . | . | . | . | . |
| 81st | 41 | 40 | 88 | 92.0 | 92.1 | 104.0 | 104.4 |

It will be seen that the first of the examples given in connection with Fig. 1 corresponds to third order modulation under Example II. It should be pointed out, however, that the various numerical examples which are given are merely illustrative of the principles of the invention. Numerous other pilot and carrier frequency combinations may readily be devised by those skilled in the art. For example, the pilot frequencies used with fifth order modulation set forth as the second example given in connection with Fig. 1 does not appear under either example column in the above table.

It will be noted in the above tabulation of examples of ways to derive a carrier of 88 kilocycles, that the frequency $P_1$ may, for example, be chosen to lie at 92 kilocycles, which is 4 kilocycles above the carrier C. $P_2$ may then be placed at 96 kilocycles if third order modulation is used or it may be moved closer to $P_1$ in definite steps by using a higher and higher order of modulation. At the 81st order, the frequencies $P_1$ and $P_2$ are only 100 cycles apart though they are 4,000 and 4,100 cycles above the 88-kilocycle carrier. Such frequencies could be utilized between signal bands on some carrier telephone systems.

Figure 2:
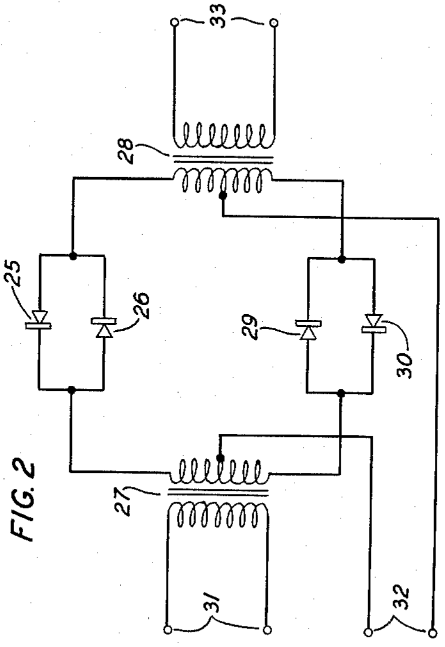
Fig. 2 is a circuit diagram of one specific third order modulator which may be used in practicing the invention.

A specific example of a third order modulator which may be used in embodiments of the present invention is shown in Fig. 2. There, a pair of copper oxide or other non-symmetrical non-linear conductors 25 and 26 are connected in parallel, but oppositely poled, between one side of the secondary winding of an input transformer 27 and one side of the primary winding of an output transformer 28. Another similar pair of non-symmetrical non-linear conductors 29 and 30 are oppositely poled and connected in parallel between the other sides of the same transformer windings. As an alternative arrangement, each pair of non-symmetrical non-linear conductors may be replaced by a single thyrite or other symmetrical non-linear conductor.

One pair of input leads 31 are connected to the primary winding of input transformer 27, while the other pair of input leads 32 are connected to center-taps on the secondary winding of input transformer 27 and the primary winding of output transformer 28, respectively. A pair of output leads 33 are connected to the secondary winding of output transformer 28.

As used at transmitting end the system shown in Fig. 1, the third order modulator shown in Fig. 2 would have terminals 31 connected to pilot generator 3, terminals 32 connected to pilot generator 4, and terminals 33 connected to band-pass filter 6. At the receiving end, band-pass filters 15 and 16 would be substituted for pilot generators 3 and 4, and band-pass filter 18 would be substituted for band-pass filter 6.

Higher odd order modulation need not, however, necessarily be done all in one step. For example, the third order product $$2P_1-P_2=C \qquad (27)$$

may be obtained in two steps where the second harmonic of $P_1$ is derived in a second order modulator like a vacuum tube or copper oxide rectifier and then the $2P_1$ product is modulated in another step of modulation with $P_2$, using another second order modulator. In the general case of order (2N−1), the Nth harmonic of $P_1$ and the (N−1)th harmonic of $P_2$ may be derived in one or several steps of harmonic production in tandem and the two final products of $NP_1$ and $(N-1)P_2$ may be modulated together in a second order modulator to produce $$NP_1-(N-1)P_2=C \qquad (28)$$

If the proper two frequencies cannot be fitted into transmission circuit 12 it may be possible to transmit three or more frequencies to drive the carrier at the receiving end. Further flexibility in the design of amplitude modulation systems is thus permitted. A brief treatment of this aspect of the invention is given below:

Let, $$a_1P_1+a_2P_2+\ .\ .\ .\ +a_nP_n=C \qquad (29)$$

where:

$C$=the carrier frequency desired, $P_1, P_2\ .\ .\ .\ P_n$ are $n$ different frequencies to be transmitted to the distant end for the purpose of deriving C, and $a_1, a_2\ .\ .\ .\ a_n$ are integers which may be either positive, negative, or zero.

In order that the derived carrier frequency at the receiving end may have the same frequency error as the sideband which has been transmitted, i. e., $C+\Delta S$, the following equation must hold:

$$a_1+a_2+\ .\ .\ .\ +a_n=+1 \qquad (30)$$

The proof of this necessary condition is given below:

$$a_1(P_1+\Delta S)+a_2(P_2+\Delta S)+\ .\ .\ .\ +a_n(P_n+\Delta S)=C+\Delta S \qquad (31)$$

From Equation 31, $$(a_1+a_2+\ .\ .\ .\ +a_n)\Delta S+a_1P_1+a_2P_2+\ .\ .\ .\ +a_nP_n=C+\Delta S \qquad (32)$$

From Equations 29 and 32

$$a_1+a_2+\ .\ .\ .\ +a_n=\frac{\Delta S}{\Delta S}=+1 \qquad (33)$$

The order of modulation required to derive the carrier frequency C from the transmitted frequencies $P_1\ .\ .\ .\ P_n$ will be the absolute sum of all the terms $a_1\ .\ .\ .\ a_n$ without regard to whether they are positive or negative.

$$\overline{a_1}+\overline{a_2}+\ .\ .\ .\ \overline{a_n}=\text{order of modulation}=M \qquad (34)$$

For example, in

3rd order: $2P_1-1P_2=C$ (35)

$\overline{a_1}+\overline{a_2}$ is $\overline{2}+\overline{-1}=3=M$ (36)

5th order: for two frequencies $3P_1-2P_2=C$ (37)

$\overline{a_1}+\overline{a_2}$ is $\overline{3}+\overline{-2}=5=M,$ (38)

or for four frequencies an example would be $$1P_1+1P_2-2P_3+1P_4=C \qquad (39)$$

$$\overline{a_1}+\overline{a_2}+\overline{a_3}+\overline{a_4} \text{ is } \overline{1}+\overline{1}+\overline{-2}+\overline{1}=5=M \qquad (40)$$

In all embodiments of the invention if the phase shift through transmission system 12 of Fig. 1 varies with frequency, and if the phase shift of the carrier is important, the effect can be minimized by bringing the pilot frequencies closer and closer to the carrier frequency.

It is to be understood that the above-described arrangements are illustrative of the application of the principles of the invention. Numerous other arrangements may be devised by those skilled in the art without departing from the spirit and scope of the invention.

What is claimed is:

1. The method of transmitting signals without distortion over a transmission system which tends to introduce uncontrolled frequency changes which comprises deriving a carrier wave as a modulation product from at least two pilot frequencies which are within the pass band of said transmission system, amplitude modulating said carrier wave with the signal, suppressing the carrier frequency component of said modulated carrier wave, transmitting said pilot frequencies and at least one of the sidebands of said modulated carrier wave over said transmission system, deriving a carrier wave as a modulation product from the pilot frequencies at the receiving end of said transmission system, and demodulating the sideband at the receiving end of said transmission system with the carrier derived at the receiving end.

2. A suppressed-carrier amplitude modulation system which comprises a signal input circuit, a second order modulator, a signal transmission system, a second order demodulator, and a signal output circuit connected in tandem transmission relation, means to derive a carrier wave for said second order modulator by intermodulating at least two pilot frequencies which are within the pass band of said transmission system, means to transmit the pilot frequencies over said transmission system with at least one of the sidebands of the modulated carrier wave, and means to derive a carrier wave for said second order demodulator by intermodulating the pilot frequencies at the receiving end of said transmission system.

3. A suppressed-carrier modulation system which comprises a signal input circuit, a second order modulator, a signal transmission system, a second order demodulator, and a signal output circuit connected in tandem transmission relation, means including a higher odd order modulator for deriving a carrier wave for said second order modulator as a modulation product from at least two pilot frequencies which are within the pass band of said transmission system, means to transmit the pilot frequencies over said transmission system with at least one of the sidebands of the modulated carrier wave, and means including a higher odd order demodulator of the same order as said higher odd order modulator for deriving a carrier wave for said second order demodulator as a modulation product from the pilot frequencies at the receiving end of said transmission system.

4. A suppressed carrier modulation system which comprises a signal input circuit, a second order modulator, a signal transmission system, a second order demodulator and a signal output circuit connected in tandem transmission relation, means including a third order modulator for deriving a carrier wave for said second order modulator by intermodulating two pilot frequencies which are within the pass band of said transmission system, means to transmit the pilot frequencies over said transmission system with at least one of the sidebands of the modulated carrier wave and, means including a third order demodulator for deriving a carrier wave for said second order demodulator by intermodulating the pilot frequencies at the receiving end of said transmission system.

References Cited in the file of this patent

UNITED STATES PATENTS

| | | |
|---|---|---|
| 1,810,326 | Peterson | June 16, 1931 |
| 1,998,119 | Cox | Apr. 16, 1935 |
| 2,034,826 | Nyquist | Mar. 24, 1936 |
| 2,186,958 | Collins | Jan. 16, 1940 |
| 2,530,614 | Hugenholtz | Nov. 21, 1950 |

FOREIGN PATENTS

| | | |
|---|---|---|
| 480,847 | Great Britain | Mar. 1, 1938 |